Jan. 21, 1941.        L. W. T. CUMMINGS        2,229,554
BOILER FOR UTILIZING MOLTEN SALT TO GENERATE STEAM
Filed Nov. 30, 1938        2 Sheets-Sheet 2

WITNESS:
Robt R Mitchel

INVENTOR
Leland W. T. Cummings
BY
Busser and Harding
ATTORNEYS.

Patented Jan. 21, 1941

2,229,554

UNITED STATES PATENT OFFICE 2,229,554

BOILER FOR UTILIZING MOLTEN SALT TO GENERATE STEAM

Leland W. T. Cummings, Wyncote, Pa., assignor to Sun Oil Company, Philadelphia, Pa., a corporation of New Jersey Application November 30, 1938, Serial No. 243,076

2 Claims. (Cl. 122—32)

In processes involving the treatment of various organic compounds, such as petroleum hydrocarbons, by passing them, usually preheated, in vapor or liquid phase, through a catalytic body in order to crack, polymerize or otherwise refine them or to transform them into other compounds, it is necessary to control the temperature of reaction. These operations are characterized by carbonaceous depositions on the catalyst which gradually reduce its activity. It, therefore, becomes necessary to regenerate the catalyst. Said regeneration may be accomplished by contacting the catalyst with air or other oxygen carrying fluid. It is known to control the temperature of catalytic reactions by the circulation, in heat exchange relation with the catalyst and the compounds passing therethrough, of certain molten or fused salts at such temperature and at such rate as to maintain the temperature of reaction within the desired range. In the case of reactions that are strongly exothermic these salts are capable of absorbing the excess heat without cooling the reaction chamber below the desired reaction temperature. These salts must then be cooled to adapt them for re-use, and it is desirable, in the economical practice of any such catalytic process, to utilize the energy of the released heat in the most efficient manner possible.

The object of my invention is to use said fused salts for generating steam. This I accomplish by the process hereinafter described, which is most efficiently conducted by means of one of the steam boilers shown in the accompanying drawings, which also embody certain novel features particularly adapting them for the described purpose.

Figure 1:
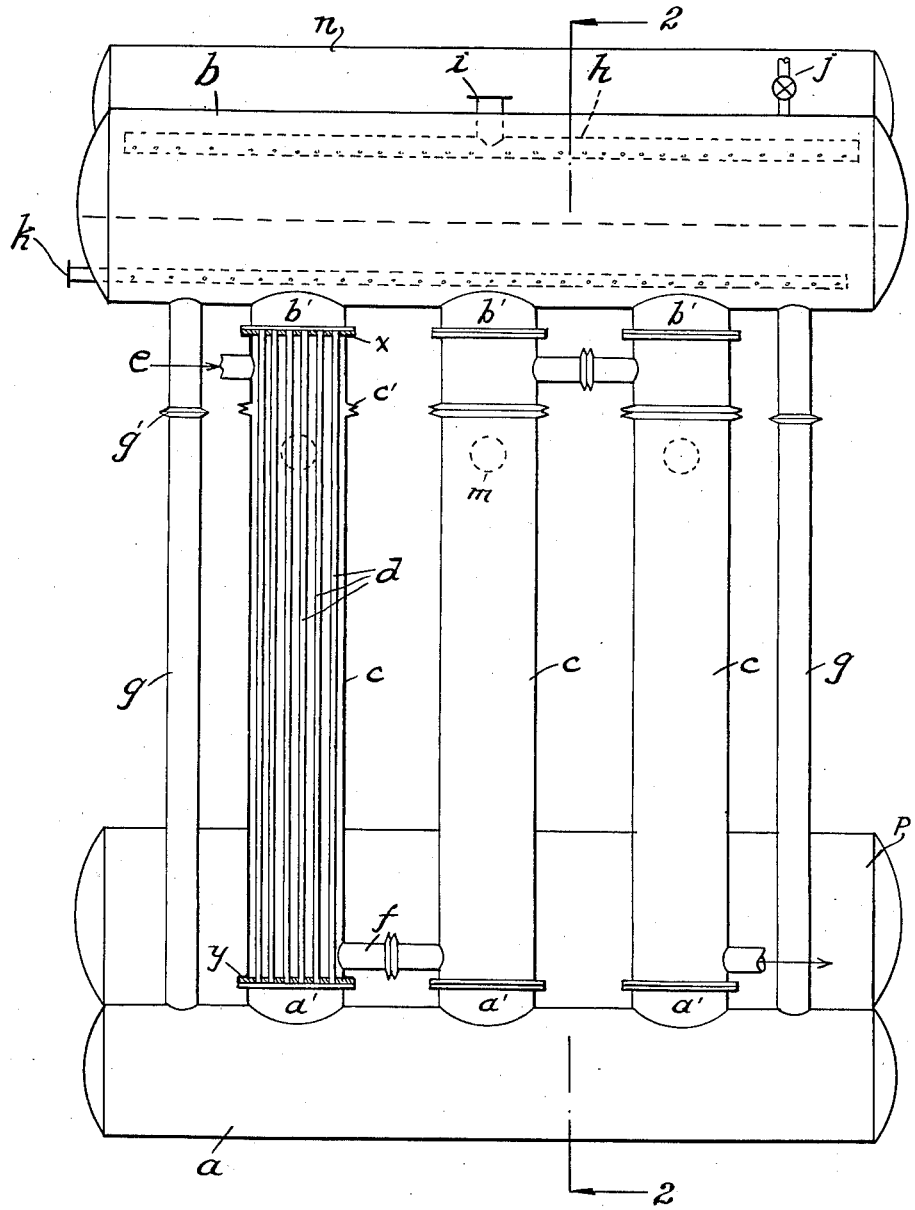
Fig. 1 is a side elevation of one of such steam boilers.

The boiler of Fig. 1 comprises a lower water drum $a$, an upper steam drum, or steam-water separator drum, $b$, of greater capacity than the water drum, and a number of boiler elements connecting nozzles $a'$ and $b'$ on the respective drums. The drawings show boiler elements of simple form, each comprising a cylindrical shell $c$ for the flowing molten salts and a number of vertically extending parallel tubes $d$ fixed in tube sheets $x$ and $y$ opening into nozzle connections $a'$ and $b'$ and through which the water flows continuously from the water drum to the steam drum, being partially converted into steam in its upward flow. The salt is admitted to the shell of the first boiler through an inlet pipe $e$ in its upper end and flows down around the tubes $d$ and in heat exchange relation with the water flowing up through the tubes and is discharged through the outlet pipe $f$ at the lower end of said element. The pipe $g$ is a downcomer for returning water to the water drum. This downcomer may be a single pipe with an expansion joint $g'$; or it may comprise bent boiler tubes rolled into both drums. Since the temperature of the shell wall of the boiler element is greater than the temperature of the tubes, the shell is also provided with an expansion joint $c'$, preferably near its upper end.

In practice it is necessary to provide a number of boiler elements, which may be arranged in parallel, in series, or in series-parallel for salt flow. In the drawings I have shown three such elements arranged in series (although in actual practice more may be required) and connecting a water drum and a steam drum common to all of the boiler elements. I have also shown two downcomer pipes arranged at opposite ends of the boiler. Downcomers may also be provided between the boiler elements as well as at the ends of the drums.

The steam drum may be provided with a dry pipe $h$ provided with perforations opening into the steam space of the drum and with a steam outlet pipe $i$. The steam drum is provided with a water inflow pipe $k$ through which water flows into the steam drum at the rate required to maintain any desired water level in the steam drum. The usual safety valve is located on the steam drum at $j$. Any well known means may be used for automatically controlling the rate of flow to maintain such water level.

From the above description it will be understood that the hot salt flows successively through the several boiler elements while water, flowing upward through the tubes, is partially converted into steam, which passes through the body of water in the steam drum into the steam space and thence through the dry pipe and out the outlet pipe.

As a safety precaution in the event of tube failure the shells $c$ are connected with pipes $m$ (see Fig. 2) opening into the shells preferably below the expansion joints $c'$ and extending upward to a common manifold $n$ which, through a pipe $o$, discharges into a tank $p$ provided with a safety valve $q$ for steam release. In the case of tube failure the mixed salt and steam discharges into the manifold $n$ and thence into the tank $p$, wherein the salt and steam separate.

Figures 2, 3, 4:
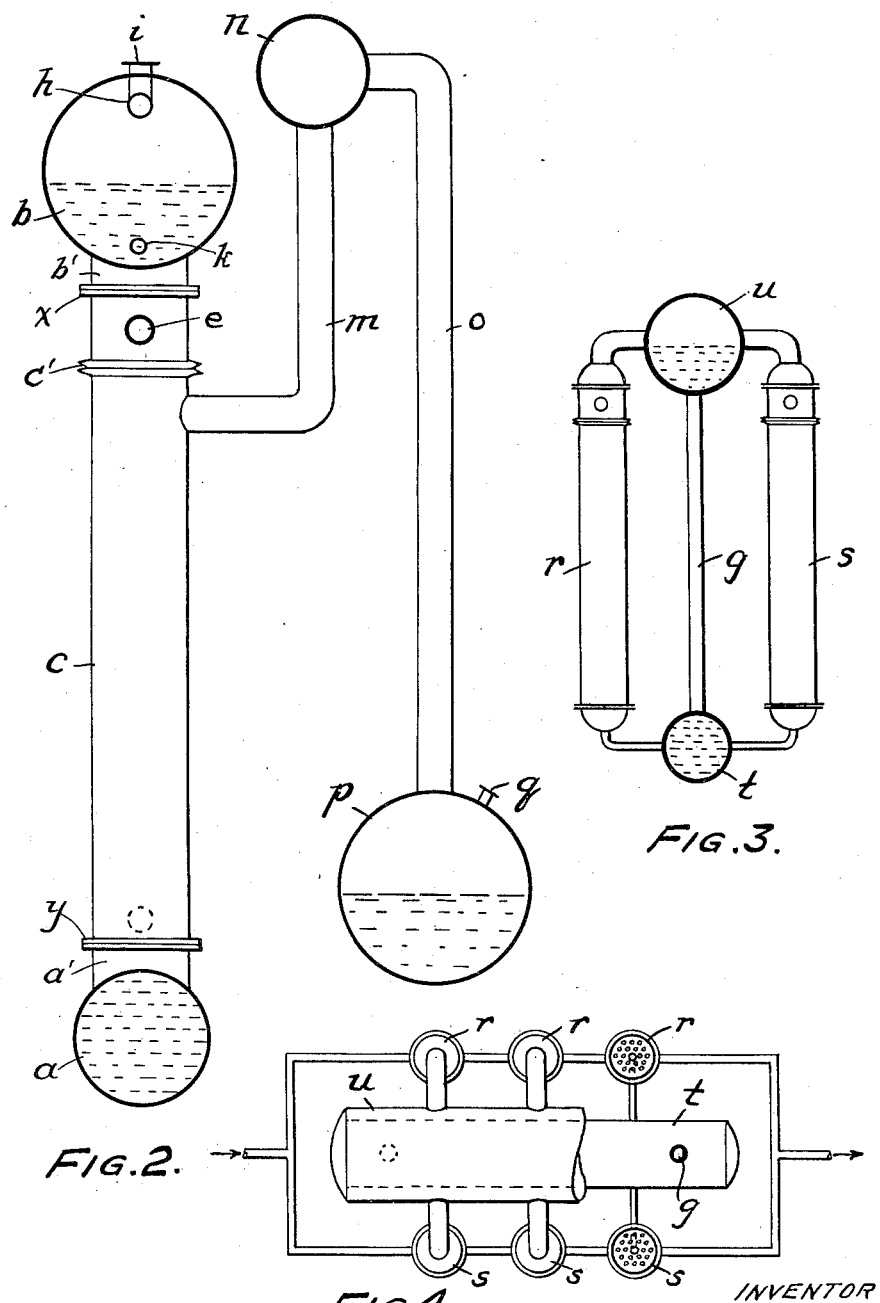
Fig. 2 is a section taken on the line 2—2 of Fig. 1.
Figs. 3 and 4 are respectively an end view and a plan view of one of a number of possible modifications.

Figs. 3 and 4 are diagrams of a series multiple arrangement wherein the inflowing salt is divided into two streams flowing respectively through the series of boiler elements $r$, $r$, $r$, and $s$, $s$, $s$ while the water flows from a water drum $t$ upward through said elements into a steam drum $u$; the two drums being common to all said elements.

Among materials which may be used to generate steam in the boiler shown and described are mixtures of fused salts, such as a mixture, by weight, of 54 parts potassium nitrate, $KNO_3$, 39 parts sodium nitrite, $NaNO_2$, and 7 parts sodium nitrate, $NaNO_3$; a mixture of 45 parts calcium nitrate, $Ca(NO_3)_2$, 20 parts sodium nitrate, $NaNO_3$, and 35 parts potassium nitrate, $KNO_3$; a mixture of either zinc chloride or aluminum chloride with sodium and/or potassium chloride; and a mixture of potassium hydroxide and sodium hydroxide.

One valuable characteristic of the boiler is that it is capable of working at widely varying capacities by merely varying the rate of flow of the salt.

As an example of the practice in the process of generating steam from molten salt wherein the incoming salt temperature is 835° F. and it is desired to remove heat therefrom at the rate of 73,800,000 B. t. u. per hour, the following data are given.

The boiler required to meet this condition consists of drums 18 feet long, with diameters of 4½ and 3 feet for the steam and water drums, respectively, and four boiler elements. Each element contains 48 two inch tubes, 22 feet in length between tube sheets, within a shell 21 inches in diameter. The salt flow rate used is 1000 gallons per minute. The steam is generated at a pressure of 450 pounds per square inch gage and 72,000 pounds per hour of saturated steam (459° F.) are produced with feed water at 212° F.

With the same rate of salt flow, but with an incoming temperature of 481° F. and an outgoing temperature of 400° F., the steam pressure will be 85 pounds per square inch and the heat removed per hour will equal 27,000,000 B. t. u.

The process and boiler are also adapted to generate steam from molten metals, for example, from any of the fusible alloys composed of all or some of the elements bismuth, lead, tin and cadmium; from mercury, diphenyl, diphenyl oxide or similar organic materials (which may flow into the boiler in vapor phase and would flow through the boiler elements in parallel, condensing and leaving the boiler elements in liquid phase); from oils; and from any flowable material which is maintained in a fluid state within a sufficiently high range of temperature.

It is possible, although less desirable, to flow the fused salt through the tubes, while the water flows up through the spaces between the tubes; it being essential only that the flowing fluids shall have heat exchange surfaces of the great area provided by a multiplicity of flowing streams in heat exchange relation.

What I claim and desire to protect by Letters Patent is:

1. A steam boiler comprising a lower water drum, an upper steam drum, a boiler element comprising a tubular shell connecting the drums and a multiplicity of tubes within the shell and affording communication between the drums and within which upflowing water is adapted to be converted into steam, means to admit a hot material in liquid phase to one end of the shell and discharge it from the other end thereof, a water downcomer pipe connecting the drums, and a pipe opening into the upper part of the shell and through which, in the event of tube failure, the said material and steam may escape, and a receiver connected with said pipe and in which the steam may be separated from said material.

2. A steam boiler comprising a lower elongated cylindrical unitary water drum, an upper elongated cylindrical unitary steam drum, water downcomer pipes connecting the two drums and a plurality of boiler elements disposed between said drums; each of said boiler elements comprising two tube sheets, one of which is secured to an opening in one of said drums and the other of which is secured to an opening in the other of said drums, and a multiplicity of tubes extending between said tube sheets and secured at opposite ends thereto whereby said tubes provide communication between said drums and provide support for one drum from the other drum; a cylindrical shell surrounding each set of tubes and extending between said tube sheets, longitudinal expansion joints in the walls of said shells, longitudinal expansion joints in said downcomer pipes, each shell having near one end thereof a heating fluid inlet and near the other an outlet for heating fluid.

LELAND W. T. CUMMINGS.